United States Patent
Shelvik et al.

(10) Patent No.: US 7,617,412 B2
(45) Date of Patent: Nov. 10, 2009

(54) SAFETY TIMER CROSSCHECK DIAGNOSTIC IN A DUAL-CPU SAFETY SYSTEM

(75) Inventors: Norman S. Shelvik, Grafton, WI (US); Daniel M. Gass, Greenfield, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 428 days.

(21) Appl. No.: 11/586,355

(22) Filed: Oct. 25, 2006

(65) Prior Publication Data

US 2008/0155318 A1   Jun. 26, 2008

(51) Int. Cl.
  *G06F 11/00* (2006.01)
(52) U.S. Cl. ......................................................... 714/12
(58) Field of Classification Search ............... 714/9–12, 714/15–18, 20, 21, 23, 31, 34, 39, 48
  See application file for complete search history.

(56) References Cited

U.S. PATENT DOCUMENTS

| | | | | |
|---|---|---|---|---|
| 4,472,789 | A * | 9/1984 | Sibley | 713/502 |
| 5,479,420 | A * | 12/1995 | Hong et al. | 714/814 |
| 5,948,111 | A * | 9/1999 | Taylor et al. | 714/10 |
| 6,247,160 | B1 * | 6/2001 | Davidsson et al. | 714/797 |
| 6,253,348 | B1 * | 6/2001 | Davidsson et al. | 714/797 |
| 6,909,923 | B2 | 6/2005 | Vasko et al. | |
| 7,089,462 | B2 * | 8/2006 | Floyd et al. | 714/55 |
| 2004/0153886 | A1 * | 8/2004 | Schumacher et al. | 714/55 |
| 2005/0060605 | A1 | 3/2005 | Gibart et al. | |
| 2005/0060606 | A1 | 3/2005 | Kalan et al. | |
| 2005/0081117 | A1 | 4/2005 | Gibart | |
| 2005/0091410 | A1 | 4/2005 | Gibart et al. | |
| 2006/0225911 | A1 | 10/2006 | Swenson et al. | |
| 2006/0230323 | A1 * | 10/2006 | Siegwart | 714/51 |

* cited by examiner

*Primary Examiner*—Nadeem Iqbal
(74) *Attorney, Agent, or Firm*—Boyle Fredrickson LLP; R. Scott Speroff

(57) ABSTRACT

A dual-processing unit with single clock source CPUs safety I/O module having a safety timer crosscheck diagnostic to enable each CPU to verify the accuracy of the clock source of the other CPU. The diagnostic works by having the first CPU act as a controlling CPU and the second CPU act as a monitoring CPU. Both CPUs are synchronized to begin one cycle of their respective safety functions at the same time. As part of the diagnostic, the controlling CPU is set to be interrupted after a pre-determined time period while the monitoring CPU is set to be interrupted slightly after that. When the controlling CPU is interrupted after the pre-determined time has passed as determined by that CPU's clock source, it sends a signal to the monitoring CPU which then verifies that the perceived time is within an expected range. To verify that the clock source of the monitoring CPU is accurate, the first CPU swaps roles to become the monitoring CPU while the second CPU becomes the controlling CPU. The CPUs are loaded again and execute one cycle of their respective safety functions. The first, now monitoring, CPU then ensures the accuracy of the clock source of the second, now controlling, CPU.

12 Claims, 3 Drawing Sheets

SAFETY TIMER CROSSCHECK DIAGNOSTIC IN A DUAL-CPU SAFETY SYSTEM

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

The present invention relates to industrial "safety controllers" used for real-time control of industrial processes and appropriate for use in devices and systems intended to protect human life and health, and in particular to "safety I/O modules," a component of a safety system.

"Safety controllers" are special purpose computers used to ensure the safety of humans working in the environment of an industrial process. Under the direction of a stored safety control program, a safety controller examines a series of inputs reflecting the status of the controlled process and changes a series of outputs controlling the industrial process. The inputs and outputs may be binary, i.e., on or off, or analog, i.e., providing a value within a continuous range. The inputs may be obtained from light curtains or other sensors attached to industrial process equipment and the outputs may be signals to power control relays, actuators or motors on the equipment.

"Safety I/O modules" are a form of distributed inputs and outputs ("I/O") and are connected to and monitored by safety controllers. One benefit of using remote I/O include the ability to place I/O where the devices reside. This greatly improves the ability to maintain and troubleshoot the I/O and devices. Further, installation time and wiring costs are greatly reduced. Safety I/O modules in particular provide additional benefits such as the ability to monitor the I/O safety reaction time, discussed in greater detail below also known as the CIP (Common Industrial Protocol) safety protocol extensions. If a safety I/O module is processing an input or output, it provides a safety reaction time which must meet industry requirements.

"Safety systems" are systems that incorporate safety controllers along with the electronics associated with emergency-stop buttons, interlock switches, light curtains and other machine lockouts to provide a safer working environment.

A critical component that factors into the design of a safety system is the "safety reaction time." The safety reaction time, also known as the "safety response time," is defined as the amount of time from a safety-related event as input to the safety system until the system is in the safe state. In other words, it is the time from electrical recognition of a safety demand such as an e-stop button depressed or light curtain traversed, until all the system's actuators operation to a safe state. The safe state is different for each system and can range from a stopped motor, a closed valve or a de-energized electrical component.

In designing safety systems, it is desirable to have a fast safety reaction time to permit the placement of safety components such as light curtains as close to machinery as possible. The safety reaction time of a safety system directly affects how close a component, e.g., a light curtain, can be placed to a piece of machinery, e.g., a press. In a properly designed safety system, the time it takes for an operator's hand to pass through a light curtain and come into contact with an unsafe machine component is greater than the time required for the safety controller to receive the light curtain input signal, process it and direct the machinery into a safe mode. Therefore, the faster the safety reaction time, the closer light curtains and similar safety devices can be mounted to the machinery. This is particularly beneficial when installation space is limited or if the machine operation includes frequent operator interventions such as inserting and removing workpieces.

The safety reaction time of an industrial system depends on the rate of data transmission between the components as well as the processing time of the safety controller. The safety reaction time is the sum of: the sensor reaction time, input reaction time, safety task reaction time, output reaction time and actuator reaction time. Each of these times is variably dependent on factors such as the type of I/O module and logic instructions within a specific safety program. The safety task reaction time of a controller is the worst-case delay from any input change presented to the controller until the processed output is set by the output producer. Each safety device implements a safety watchdog timer to limit the safety task reaction time to a maximum permissible time. If the safety task reaction time exceeds the safety watchdog timer, the safety device will fault and the outputs will automatically transition to a safe state.

In conjunction with the importance of having a fast safety reaction time, it is equally, if not more so, important that a safety system have a repeatable and reliable safety reaction time. Repeatability and reliability are critical because the various guard components of a safety system are installed at distances calculated using the safety reaction time. It would be unacceptable to place a light curtain at a certain calculated "safe" distance from a machine, only to have the safety reaction time drift higher after the installation. If that were to happen, it would be possible that an operator could come into contact with harmful machinery before it had fully entered its safe state.

To this extent, industry standards exist to ensure the proper operation, and therefore an accurate safety reaction time, of a safety device. For example, the International Electrotechnical Commission (IEC) developed standard 61508, entitled *Functional Safety of Electrical/Electronic/Programmable Electronic Safety-Related Systems*. IEC 61508 specifies 4 safety integrity levels (SILs) of safety performance for a safety function. Safety systems with a SIL of 2 (SIL 2) and 3 (SIL 3) generally require redundancy for sensors, final control elements and control system processors.

SIL 3-compliant safety devices typically have dual central processing units, also known as processors or CPUs, running independent safety functions. The safety functions have some shared commonality but also perform different tasks. The CPUs rely on standard watchdog timers, as are well known in the art, to verify that their clock sources are delivering a consistently steady clock pulse. Verification of the clock sources is needed to verify that the safety devices are providing the correct safety reaction times. However, watchdog timers are based on the frequency driving the CPU and therefore are only as accurate as the underlying clock source. Typically, a quartz-based oscillator is used to generate the clock pulses, i.e., the frequency, that drive a CPU, among other things. Under normal operating conditions, these oscillators are extremely reliable and durable. However, in an industrial environment, the crystals can get hot, jostled or contaminated causing them to drift and become unreliable.

If an oscillator clock source were to drift slower than the rated speed, the CPU driven by it would also run slower. For example, if a normally-rated 3.0 GHz CPU had a slightly slower clock source, it might instead run at 2.99999 GHz. If the system clock is tracking time by counting clock pulses, after $3.0 \times 10^9$ pulses, the actual elapsed time would be slightly longer than one second but the system clock would indicate that exactly one second has elapsed. Without an independent clock source to verify that $3.0 \times 10^9$ pulses took exactly one second, the CPU would have no way to know that it was operating slower or faster than normal. One potential real-life result of this could be a situation where a safety reaction time was designed and advertised to be 6.0 ms but in actuality ends up being closer to 6.1 ms. A watchdog function controlled by an independent clock source could detect the clock source speed drift and the safety system could respond accordingly. Although these numbers may appear to be minute timing differences, the SIL requirements for safety devices and safety systems are very demanding.

Therefore it is necessary that each CPU in a dual-CPU safety device have an independent clock source to verify that its own single clock source is operating within specified parameters. Traditional safety devices have multiple independent clock sources and therefore can use one of those clock sources when running a diagnostic to verify the accuracy of the primary clock source. In an attempt to make safety devices, such as safety I/O modules, smaller, each CPU may have only one clock source. However, there is no way for the device to verify the accuracy of each clock source without an external, independent clock source. This can be a problem with lesser expensive single clock source CPUs.

In a dual-CPU safety device having single clock source CPUs, one possible solution to the lack of independently verifying clock sources would be to use the clock source of the partner CPU to cross-check and verify the accuracy of the clock source of the primary CPU. However, this solution provides no way to ensure that the clock source of the partner, i.e., verifying, CPU is accurate. If the verifying CPU's clock source has drifted, it will not provide proper verification of the accuracy of the primary CPU's clock source. In other words, in the absence of a cross check, an inaccurate clock source in the partner CPU could be used to check the clock source of the primary CPU as well as verify that its own safety critical functions were completed within the rated safety reaction time Presently, there is no way to verify that the clock source of the second CPU, i.e., the verifying CPU, is itself accurate without using an independent clock source. However, a single clock-source CPU does not, by its nature, have an independent clock source. For this reason, there is a need for developing a dual-CPU safety device wherein the two single clock source CPUs regularly swap roles to check the accuracy of each other's clock source. A diagnostic solving this problem would enable the primary and secondary CPU, both of which cannot accurately check their own clock source, to verify each other's clock source while being assured that the other clock source has already been checked by them.

SUMMARY OF THE INVENTION

The present invention provides a dual-CPU safety device that validates the accuracy of the clock source for each CPU. Through a diagnostic, the first CPU verifies the accuracy of the clock source of a second CPU and then the second CPU verifies the clock source of the first CPU. If it is determined that either CPU has a faulty clock source, the safety device faults and the controlled process enters a safe state.

In a preferred embodiment, a safety device comprises a first processing unit having a first processor, i.e., CPU, driven by a first clock source executing a first safety loop of safety critical functions, or routines, a second, independent processing unit having a second processor driven by a second clock source executing a second safety loop of safety critical functions, a communication link between the first and second processors, a synchronization routine and a diagnostic. The synchronization routine is executed by the first and second processors to synchronize the start of a cycle of their respective safety loops. The diagnostic is executed by both the first and second processors such that one processor verifies the completion of its own safety tasks while the other processor monitors the accuracy of the clock source of the first processor. In the first part of the diagnostic, the first processor verifies that it has completed all the safety critical functions of a safety loop within the safety reaction time while the second processor verifies the clock source of the first processor. After the safety reaction time has elapsed, i.e., as determined when a system clock in the first processing unit reaches an interrupt value loaded into a timer compare register, the first processor checks whether all of its safety critical functions have been completed. If not, the first processor faults. If they have been completed, the first processor sends a rendezvous signal to the second processor which then determines if the safety reaction time, as determined by the first processor using its clock source, is within a pre-set range. This check verifies whether or not the clock source of the first processor is reliably providing clock pulses. If it is not, the second processor faults and enters a safe state. If the second processor does not receive the rendezvous signal before it times out, it will also fault.

If the elapsed time is within the range, the first and second processors swap roles wherein the first processor monitors the accuracy of the clock source of the second processor. After one cycle of the second safety loop, i.e., after the safety reaction time has elapsed as calculated by the clock source of the second processor, the second processor verifies its safety critical functions have been completed. If not, the second processor faults. If they have been completed, the second processor sends a rendezvous signal to the first processor which then determines if the safety reaction time, as determined by the second processor using its clock source, is within a pre-set range. The two processors continue swapping roles while the diagnostic is running.

DETAILED DESCRIPTION OF THE PREFERRED EMBODIMENT

Figure 1:
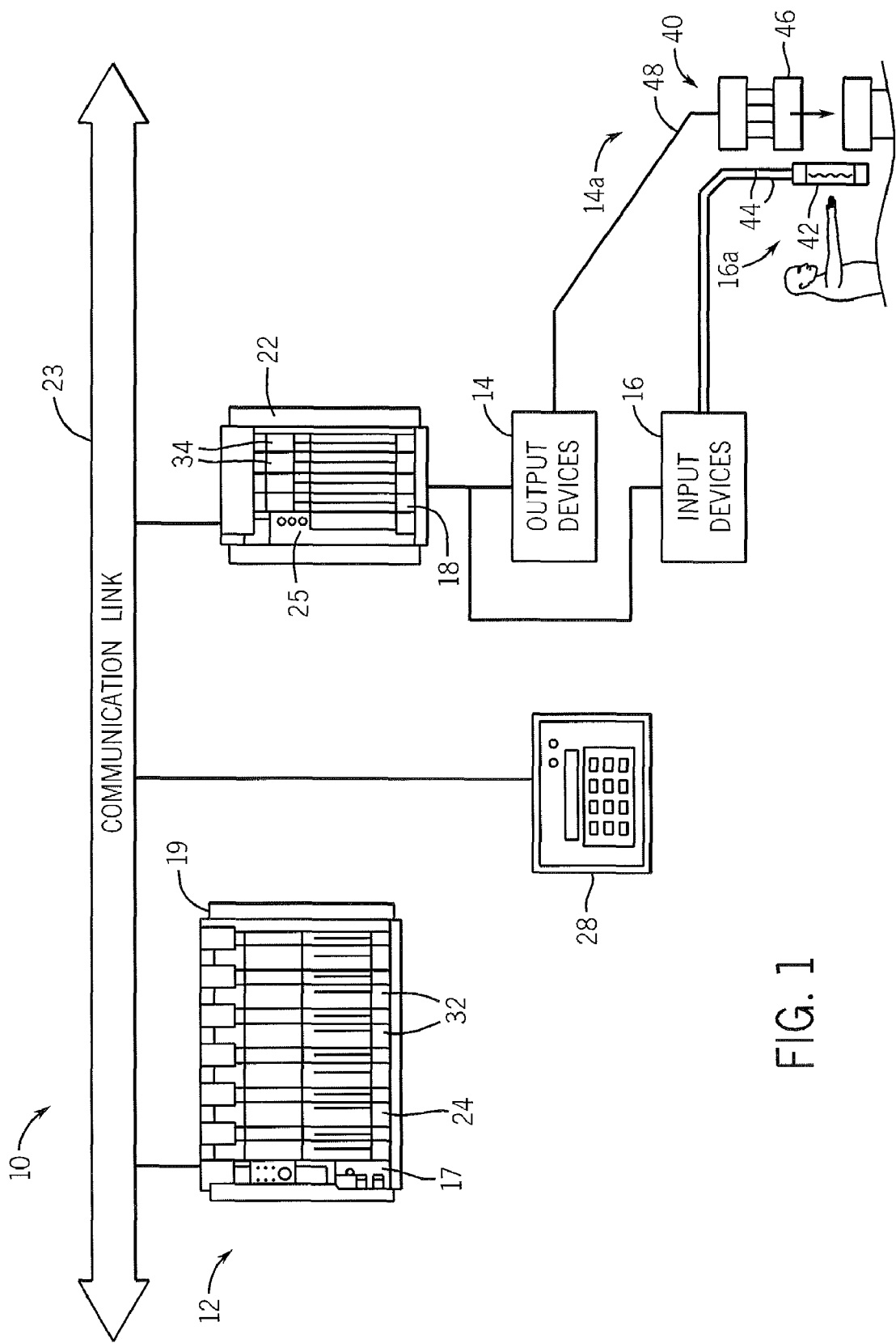
FIG. 1 is an industrial control system that includes a dual-CPU safety device suitable for use with the present invention having a controlling and validating CPU.

Referring now to FIG. 1, an industrial control system 10 is illustrated. The industrial control system 10 utilizes programmable input/output (I/O) circuits that are described in greater detail below. It should be noted that the industrial control system 10 is merely one example of an industrial control system that could utilize the present invention, and that other systems are also possible.

The industrial control system 10 comprises a programmable control system 12 that controls the output status of a plurality of output devices 14 based on the input status of a plurality of input devices 16. To this end, the programmable control system 12 has a microprocessor-based processor module 17 that executes a stored control program which defines the manner in which the output devices 14 are controlled.

The processor module 17 communicates with the I/O devices 14 and 16 by way of an I/O module 18. In particular, the processor module 17 transmits a digital representation of the desired output status of the output devices 14 to the I/O module 18. Based on the digital representation of the desired output status of the output devices 14, the I/O module 18 produces an output control signal that is capable of driving the output devices 14 in the desired manner. Likewise, the processor module 17 receives a digital representation of the input status of the input devices 16 from the I/O module 18. The I/O module 18 produces the digital representation of the input status of the input devices 16 based on input status signals received from the input devices 16.

In a present example, a controlled safety process 40 includes a light curtain 42 providing redundant light curtain signals 44 to the I/O module 18 and a press 46 that may be stopped via a halt signal 48 sent to the press 46 from the I/O module 18. The safety process 40 is designed to stop the press 46 if the plane of the light curtain 42 is crossed. The speed of response, i.e., the safety reaction time, of the I/O module 18 in halting the press 46 after an object cross the plane of the light curtain 42 is factored into the calculation to determine the required amount of separation between the light curtain 42 and the press 46.

Figure 2:
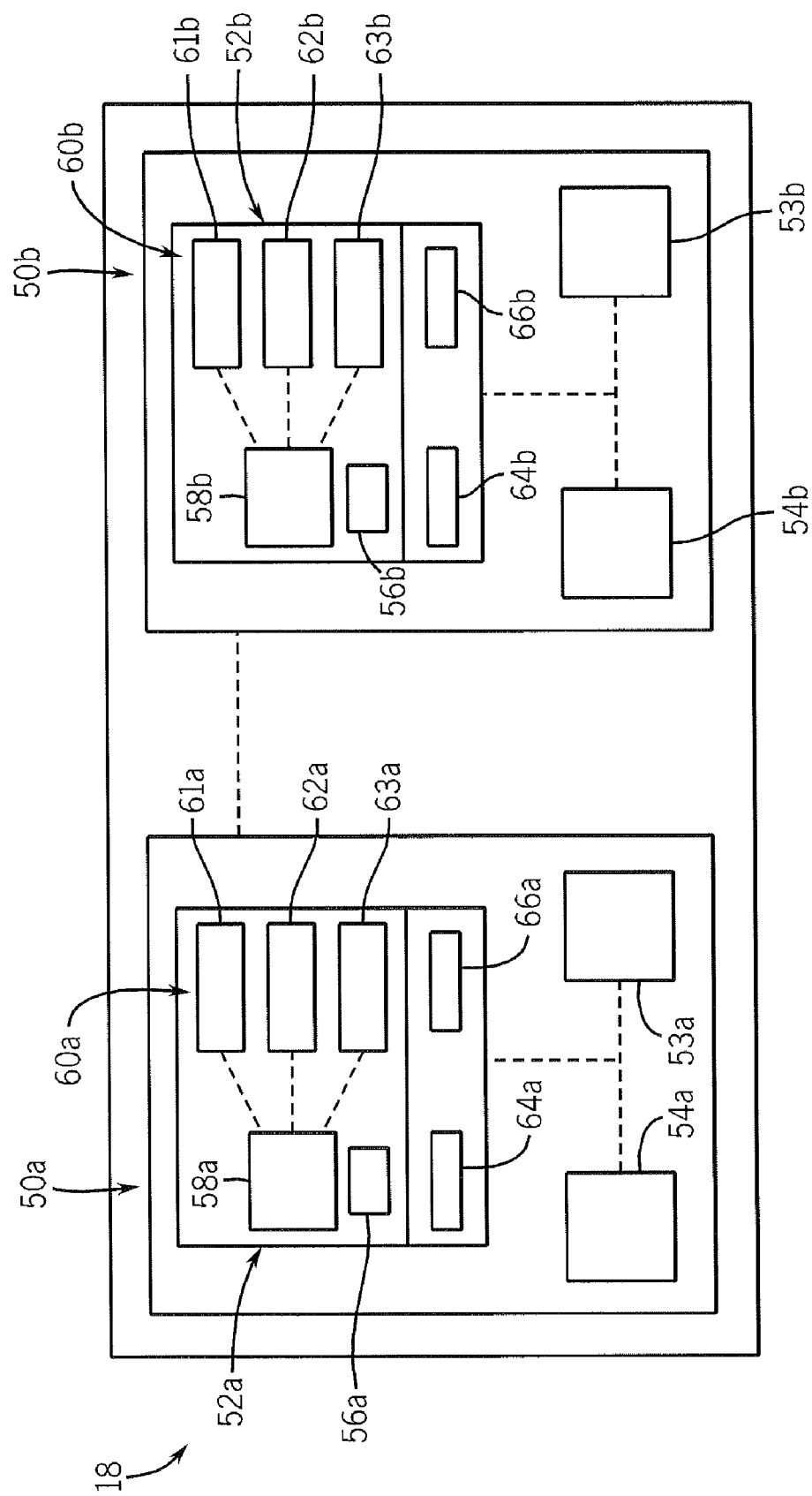
FIG. 2 is an electrical schematic representation of a controlling and validating processor in the safety device of FIG. 1.

Referring now to FIG. 2, I/O module 18 includes primary processing unit 50a communicating via a serial communication protocol known in the art to partner processing unit 50b. Primary processing unit 50a includes a first, or controlling processor, or CPU, 52a and a system clock 53a, both of which are driven by a single clock source 54a. The system clock 53a in a preferred embodiment increments in one microsecond intervals. The CPU 52a has an internal ROM 56a (read only memory) which holds an executive, or firmware, image 58a of executables 60a comprised of safety critical functions 61a, diagnostic code 62a, and non-safety functions 63a. CPU 52a further includes a flag 64a and a timer interrupt function implemented with a compare register 66a wherein the compare register 66a is loaded with a preset time value. When the system clock 53a reaches the value stored in the compare register 66a, CPU 52a will interrupt the execution of the executive image 58a. Partner processing unit 50b includes mostly the same, though independent, components including a processor 52b and system clock 53b driven by a single clock source 54b, ROM 56b, firmware image 58b of slightly different executables 60b comprised of safety critical functions 61b, diagnostic code 62b and non-safety functions 63b, flag 64b and compare register 66b providing the same timer interrupt functionality.

Figure 3:
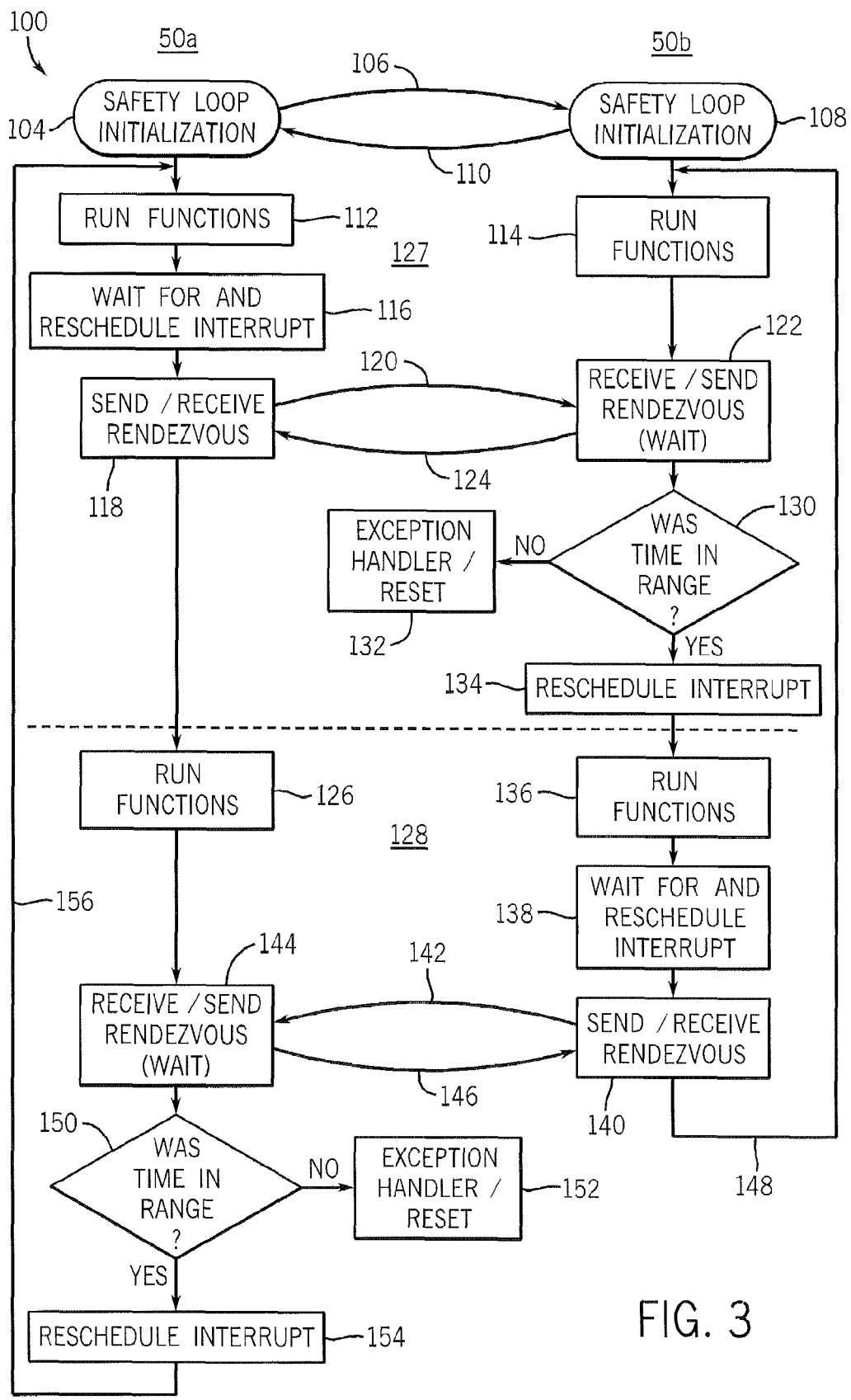
FIG. 3 is a flowchart of a safety timer cross-check diagnostic executed in the dual CPU safety device of FIG. 1.

FIG. 3 is a visual representation of the process wherein I/O Module 18 performs the safety timer cross-check diagnostic 100 beginning at start blocks 104, 108 representing a "safety loop" initialization process. The safety loop initialization process serves two functions; it ensures that both CPUs 52a, 52b have interrupts loaded prior to entry of the safety loop and it also synchs up the two CPUs 52a, 52b to begin the safety loop at the same time. This synching is shown by a rendezvous message 106 and an acknowledgement message 110 between the two processing units 50a, 50b.

As previously mentioned, timer compare registers 66a, 66b are used to generate the interrupts in CPUs 52a, 52b. In a preferred embodiment, the first interrupt is scheduled in CPU 52a, acting as controlling CPU, by loading compare register 66a with a value representing the 6 ms from when the previous interrupt was scheduled to occur. The 6 ms time period represents the rated safety reaction time of the I/O module 18. An interrupt is also scheduled in CPU 52b, acting as monitoring CPU, to occur at a time slightly longer than the 6 ms time loaded into CPU 52a. The extra time, e.g., 0.1 ms, acts as a cushion or tolerance and is necessary due to the slight delay between CPU 52a being interrupted and processing unit 50a sending a rendezvous message to processing unit 50b as well as to allow for slight time differences between the processing units 50a, 50b.

After the interrupts have been scheduled, i.e., after the timer compare registers 66a, 66b have been loaded, processing units 50a, 50b have essentially begun executing a first safety loop 127. As previously discussed, in the first safety loop 127, while running the diagnostic 100, processing unit 50a acts as the controlling unit while partner processing unit 50b acts as the monitoring unit. As shown in blocks 112 and 114, CPUs 52a, 52b in each processing unit 50a, 50b process the executables 60a, 60b, including safety critical functions 61a, 61b and non-safety functions 63a, 63b. After completing the safety functions 61a which in this example this typically occurs after 4 ms have elapsed, an internal flag 64a is set. This flag indicates that the safety critical functions 61a, have been completed by the controlling CPU 52a within the rated safety reaction time. Thereafter, CPU 52a executes non-safety functions 63a while waiting for the timer interrupt, shown as block 116. Meanwhile, CPU 52b finishes executing safety critical functions 61b, sets flag 64b and begins executing non-safety functions 63b while waiting for either rendezvous message 120 from processing unit 50a or for its own timer interrupt, shown as block 122.

When the system clock 53a matches the scheduled interrupt time loaded in the timer compare register 66a, i.e., after 6 ms have elapsed based on the input from clock source 54a, CPU 52a interrupts the processing of the executive image 58a. Alternatively, instead of loading the timer compare register 66a to interrupt after the safety reaction time has elapsed, CPU 52a could repeatedly poll a timer or counter to determine when the time has elapsed. However, this is not the preferred approach as it offers no watchdog function to protect against the case where CPU 52a encounters unexpected delays.

After the interrupt occurs, CPU 52a immediately schedules a new interrupt to occur after another 6 ms plus the cushion have elapsed. The cushion is included because CPU 52a becomes the monitoring unit during the next safety loop 128. The interrupt is scheduled by loading the compare register 66a with a value representing the next desired interrupt time and is scheduled immediately after the previous interrupt to ensure that processing system 50a is always protected against any unexpected delays.

CPU 52a next checks whether or not flag 64a is set. If flag 64a is not set, i.e., all the safety critical functions 61a were not completed, a hard or critical fault occurs. Processing unit 50a goes into a safe state and then resets. If the flag 64a is set, a rendezvous signal 120 is sent to processing unit 50b from block 118 to indicate that the time value loaded into compare register 66a, i.e., the safety reaction time of 6 ms, has elapsed as perceived by processing unit 50a.

In block 122, processing unit 50b receives the rendezvous signal 120 and promptly replies with an acknowledgement signal 124. In the event of an unexpected delay or inaccurate clock such that CPU 52b is interrupted before receiving rendezvous signal 120, a critical fault will occur wherein the processing unit 50b will go into a safe state and then reset. Otherwise, after receiving rendezvous message 120, CPU 52b checks whether or not flag 64b is set, indicating that all safety functions 61b have been completed. If flag 64b is not set, a critical fault will also occur. If flag 64b is set, processing unit 50b determines whether or not the elapsed safety reaction time, as determined by CPU 52a using clock source 54a, is within the allowable range or cushion (decision block 130). In essence, processing unit 50b is checking the accuracy of clock source 54a by comparing what processing unit 50a determined 6 ms to be against what processing unit 50b, using clock source 54b, determined 6 ms (plus the cushion) to be.

If the safety reaction time of processing unit 50a is not within an acceptable range, the processing unit 50b will fault, shown as block 132. If the safety reaction time of processing unit 50a is within the acceptable range, processing unit 50b moves to block 134 and schedules the next interrupt. Since CPU 52b will act as the controlling CPU in the next safety loop 128, the value loaded into timer compare register 66b is the value of 6 ms from the current time.

At this point, the roles of the primary processing unit 50a and partner processing unit 50b are reversed wherein the primary processing unit 50a becomes the monitoring processing unit while partner processing unit 50b becomes the controlling processing unit. This symmetry, i.e., role-swapping, is useful because at this point in the diagnostic 100, only the clock source 54a of primary processing unit 50a has been verified as being accurate. By swapping roles, the diagnostic 100 ensures that both CPUs 52a, 52b have the ability to accurately measure time as well as the ability to interrupt to generate a fault.

As shown in blocks 126 and 136, CPUs 52a, 52b of each processing unit 50a, 50b process the executables 60a, 60b, including safety critical functions 61a, 61b again. After completing the safety functions 61a, 61b, internal flags 64a, 64b are set. Thereafter, CPU 52b waits for its timer interrupt shown as block 138 while CPU 52a waits for either rendezvous message 142 from processing unit 50b or for its own timer interrupt.

When the system clock 53b matches the scheduled interrupt time value loaded in timer compare register 66b, i.e., after 6 ms have elapsed based on the input from clock source 54b, CPU 52b interrupts processing. After the interrupt, the CPU 52b immediately schedules a new interrupt (with cushion) to prepare for monitoring, as previously discussed. Next, CPU 52b checks whether or not the flag 64b is set. If flag 64b is not set, a critical fault occurs in processing unit 50b which goes to a safe state and then resets. If the flag 64b is set (block 140), a rendezvous signal 142 is sent to processing unit 50a to indicate that the time loaded into compare register 66b, i.e., the safety reaction time of 6 ms, has elapsed as determined by processing unit 50b using clock source 54b. Processing unit 50a meanwhile receives signal 142 (block 144) and promptly replies with acknowledgement signal 146. Processing unit 50b enters a new safety loop and begins processing safety functions 61a (shown as return path 148 to safety loop 127).

In the event that CPU 52a is interrupted before receiving rendezvous signal 142, (as a result of an unexpected delay or inaccurate clock), a critical fault occurs wherein the processing unit 50a will go to a safe state and then reset. After receiving rendezvous signal 142, CPU 52a checks whether or not flag 64a is set. If flag 64a is not set, a critical fault would also occur. If flag 64a is set, processing unit 50a (decision block 150) determines whether or not the elapsed safety reaction time, as calculated by CPU 52b using clock source 54b, is within the allowable range or cushion.

If the safety reaction time, as determined using clock source 54a, is not within the acceptable range, the processing unit 50a will fault, shown as block 152. If the safety reaction time is within the acceptable range, processing 50a unit moves to block 154 where the next interrupt is scheduled. Since 52a will be the controlling CPU again, the value loaded into timer compare register 66a would be 6 ms from the time the last interrupt was scheduled by CPU 52a, in block 116 (ensuring that the combined time of safety loops 127 and 128 is exactly two safety reaction times, i.e., 12 ms). Processing unit 50a then enters a new safety loop and begins processing safety functions 61a (shown as return path 156 to safety loop 127).

The safety timer cross-check diagnostic 100 can be repeated at a pre-determined frequency while CPUs 52a, 52b of processing units 50a, 50b continue to perform the executables 60a, 60b, within the safety loops. It is specifically intended that the present invention not be limited to the embodiments and illustrations contained herein, but include modified forms of those embodiments including portions of the embodiments and combinations of elements of different embodiments as come within the scope of the following claims.

We claim:

1. A safety device comprising:
 a first processing unit having a first processor driven by a first clock source executing a first safety loop;
 a second processing unit independent from the first processing unit having a second processor driven by a second clock source executing a second safety loop;
 a communication link between the first and second processors;
 a synchronization routine executed by both the first and second processing units to synchronize the start of the first and second safety loops; and
 a diagnostic executable by both the first and second processing units wherein the second processor monitors the accuracy of the first clock source, the diagnostic determines if the accuracy of the first clock source is within an acceptable range, and the first processor monitors the accuracy of the second clock source.

2. The safety device of claim 1, wherein the diagnostic program determines if the accuracy of the clock source of the second processor is within an acceptable range.

3. The safety device of claim 2, wherein the monitoring is repeatedly performed by each processor in an alternating manner.

4. The safety device of claim 3, wherein the processors switch monitoring roles after completing a loop of their respective safety programs.

5. A method of operating a safety device having a first and second processing unit, each including an independent processor, memory and single clock source, the memory of each of the first and second processing units loadable with a first and second safety program and input/output variables, the safety programs being repeatedly executable to read input variables representing inputs from external controlled devices and write output variables representing outputs to external controlled devices, the method comprising the steps of:
 a) synchronizing the first and second processors;
 b) loading the first and second processors with first and second predetermined interrupt times;
 c) executing at least one loop of both safety programs, d) interrupting the first processor after the first interrupt time has elapsed as perceived by the first processor;
e) sending a signal to the second processing unit; and
f) determining whether the first interrupt time as measured by the second processor substantially equals the first interrupt time of the first processor as measured by the first processor.

6. The method of claim 5, further comprising the steps of:
g) re-synchronizing the first and second processors;
h) reloading the first and second processors with pre-determined interrupt times;
i) executing at least one loop of both safety programs;
j) interrupting the second processor after the second interrupt time has elapsed as perceived by the second processor;
k) sending a signal to the first processing unit; and
l) determining whether the second interrupt time as measured by the first processor substantially equals the time for the second interrupt as measured by the second processor.

7. The method of claim 6, further comprising the steps of:
m) repeatedly executing safety loops while monitoring the clock sources of each processing unit; and
n) entering a safe state if either clock source is determined to be inaccurate.

8. An I/O module comprising:
a first processing unit having a first processor driven by a first clock source;
a second processing unit having a second processor independent from the first processor driven by a second clock source independent from the first clock source wherein the second processor is syschronized with the first processor; and
a diagnostic running in the first and second processing units; wherein the diagnostic validates the accuracy of each clock source, the diagnostic initially assigns the first processor to be a controlling processor and the second processor to be a monitoring processer, and the monitoring processor is set to be interrupted after the controlling processor is set to be interrupted.

9. The I/O module of claim 8, wherein after the controlling processor is interrupted, the controlling processor sends a signal to the monitoring processor.

10. The I/O module of claim 9, wherein the monitoring processor verifies the accuracy of the clock source of the controlling processor.

11. The I/O module of claim 10, wherein the module enters a safety state if the monitoring processor determines that the accuracy of the clock source of the controlling processor is not within a preset range.

12. The I/O module of claim 11, wherein the first and second processors switch roles and one loop of each safety program is re-executed.

* * * * *

UNITED STATES PATENT AND TRADEMARK OFFICE
CERTIFICATE OF CORRECTION

| | |
|---|---|
| PATENT NO. | : 7,617,412 B2 |
| APPLICATION NO. | : 11/586355 |
| DATED | : November 10, 2009 |
| INVENTOR(S) | : Shelvik et al. |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 444 days.

Signed and Sealed this

Nineteenth Day of October, 2010

David J. Kappos
*Director of the United States Patent and Trademark Office*